US011046191B2

(12) United States Patent
Tan et al.

(10) Patent No.: US 11,046,191 B2
(45) Date of Patent: Jun. 29, 2021

(54) DRIVE SYSTEM AND DRIVE CONTROL METHOD

(71) Applicant: MITSUBISHI ELECTRIC CORPORATION, Chiyoda-ku (JP)

(72) Inventors: Yohei Tan, Chiyoda-ku (JP); Yoshihiro Miyama, Chiyoda-ku (JP); Shigeki Harada, Chiyoda-ku (JP); Masahiro Iezawa, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 192 days.

(21) Appl. No.: 16/344,213

(22) PCT Filed: Aug. 30, 2017

(86) PCT No.: PCT/JP2017/031273
§ 371 (c)(1),
(2) Date: Apr. 23, 2019

(87) PCT Pub. No.: WO2018/123141
PCT Pub. Date: Jul. 5, 2018

(65) Prior Publication Data
US 2019/0308606 A1 Oct. 10, 2019

(30) Foreign Application Priority Data

Dec. 28, 2016 (JP) .............................. JP2016-254886

(51) Int. Cl.
B60W 20/00 (2016.01)
B60L 50/15 (2019.01)
(Continued)

(52) U.S. Cl.
CPC ................ B60L 50/15 (2019.02); B60K 6/46 (2013.01); B60L 3/00 (2013.01); B60L 7/14 (2013.01);
(Continued)

(58) Field of Classification Search
CPC .... B60L 50/15; B60L 7/14; B60L 3/00; B60L 9/18; B60L 2210/30; B60L 2210/40;
(Continued)

(56) References Cited

U.S. PATENT DOCUMENTS 5,775,449 A * 7/1998 Moroto ................. B60W 10/02
180/65.235
6,146,302 A * 11/2000 Kashiwase ............ B60W 10/02
475/5
(Continued)

FOREIGN PATENT DOCUMENTS

JP 3-203501 A 9/1991
JP 03203501 A * 9/1991
(Continued)

OTHER PUBLICATIONS

International Search Report dated Nov. 28, 2017 in PCT/JP2017/031273 filed on Aug. 30, 2017.

Primary Examiner — Jonathan M Dager
Assistant Examiner — Jean W Charleston
(74) Attorney, Agent, or Firm — Xsensus LLP

(57) ABSTRACT

A drive system including: a battery; a power generation device (PGD) including a power generator (PG) mounted to an engine shaft and an inverter converting AC-voltage of the PG into DC-voltage; a drive device (DD) including a motor driving a driven component and an inverter performing bi-directional conversion between AC-voltage of the motor and DC-voltage; a switching device (SD) including a plurality of switches switching a connection of the battery and the PGD at both ends of the DD between a series connection (S-connection) and a parallel connection (P-connection) for connection; a reactor arranged between the battery and SD or between the PGD and the DD; and a controller controlling each of the SD, PGD, and DD, wherein the controller uses, when a speed of the driven component is being changed, the (Continued)

SD to fix the connection of the battery and PGD to S-connection or P-connection after alternately switching the connection between the S-connection and the P-connection.

17 Claims, 11 Drawing Sheets

(51) Int. Cl.
*B60K 6/46* (2007.10)
*B60L 7/14* (2006.01)
*B60W 10/06* (2006.01)
*B60L 3/00* (2019.01)
*H02J 7/00* (2006.01)
*B60W 10/08* (2006.01)
*B60L 9/18* (2006.01)

(52) U.S. Cl.
CPC .............. *B60L 9/18* (2013.01); *B60W 10/06* (2013.01); *B60W 10/08* (2013.01); *B60W 20/00* (2013.01); *H02J 7/00* (2013.01); *B60L 2210/30* (2013.01); *B60L 2210/40* (2013.01); *B60W 2510/0638* (2013.01); *B60W 2510/083* (2013.01); *B60W 2510/242* (2013.01); *B60W 2710/0644* (2013.01); *B60Y 2200/91* (2013.01); *B60Y 2200/92* (2013.01); *B60Y 2400/61* (2013.01); *Y02T 10/62* (2013.01); *Y02T 10/70* (2013.01); *Y02T 10/7072* (2013.01); *Y02T 10/72* (2013.01)

(58) Field of Classification Search
CPC ....... B60L 58/10; B60W 10/06; B60W 10/08; B60W 20/00; B60W 2510/0638; B60W 2510/083; B60W 2710/0644; B60W 2510/242; B60K 6/46; Y02T 10/62; Y02T 10/70; Y02T 10/72; Y02T 10/7072; B60Y 2200/91; B60Y 2200/92; B60Y 2400/61; H02J 7/00; H02J 1/082; H02J 2310/48; H02J 7/1415; H02J 7/0063
USPC .......................................................... 701/22
See application file for complete search history.

(56) References Cited

U.S. PATENT DOCUMENTS

| | | | |
|---|---|---|---|
| 6,327,852 B1* | 12/2001 | Hirose | B60W 10/06 60/297 |
| 9,975,449 B2 | 5/2018 | Takeshima et al. | |
| 2001/0032621 A1* | 10/2001 | Kojima | F02D 41/26 123/492 |
| 2003/0081440 A1* | 5/2003 | Komatsu | B60L 3/0023 363/132 |
| 2004/0160792 A1* | 8/2004 | Youm | H02M 1/32 363/37 |
| 2009/0230908 A1* | 9/2009 | Soma | B60L 50/16 318/452 |
| 2009/0319109 A1* | 12/2009 | Ando | B60K 1/02 701/22 |

FOREIGN PATENT DOCUMENTS

| | | | |
|---|---|---|---|
| JP | 2010-183768 A | | 8/2010 |
| JP | 2014-3858 A | | 1/2014 |
| JP | 2015-126687 A | | 7/2015 |
| JP | 2015126687 A | * | 7/2015 |
| WO | WO 2008/062590 A1 | | 5/2008 |
| WO | WO 2016/117438 A1 | | 7/2016 |

* cited by examiner

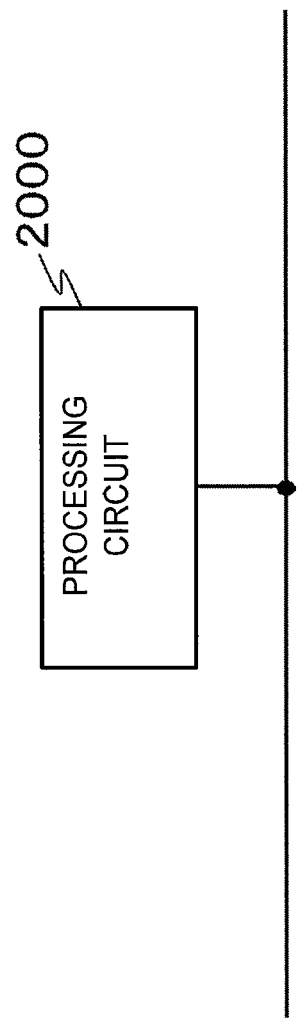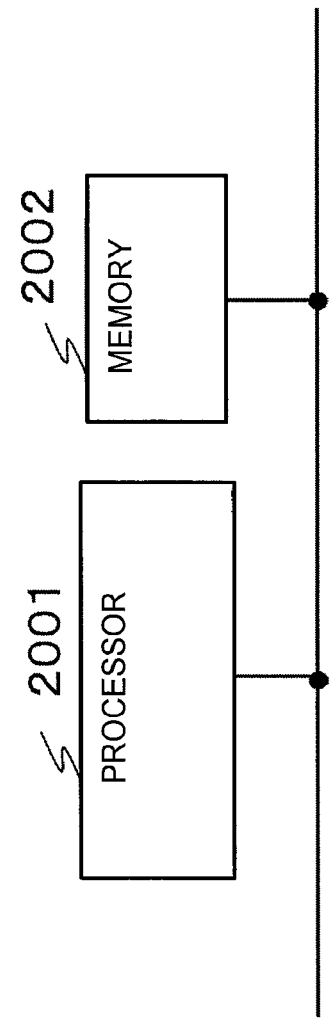

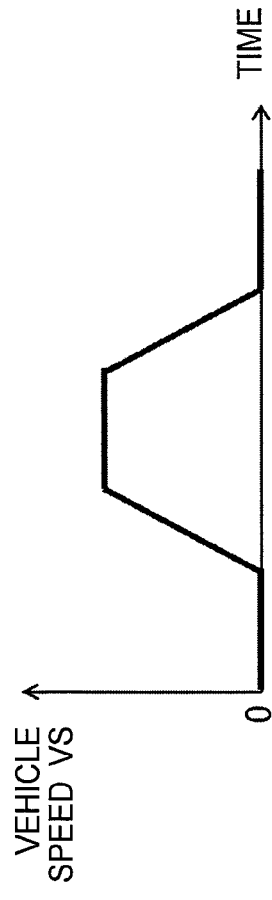
FIG.8A VEHICLE SPEED VS
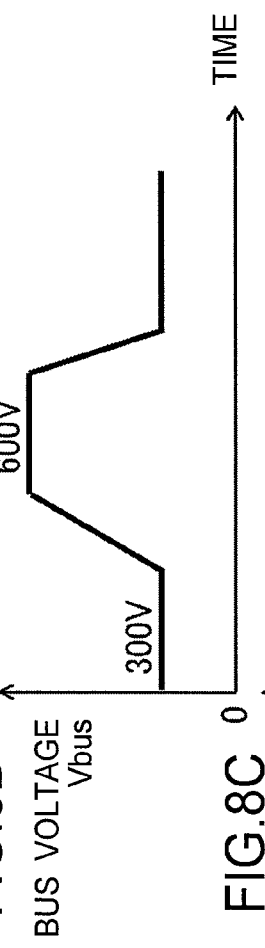
FIG.8B BUS VOLTAGE Vbus
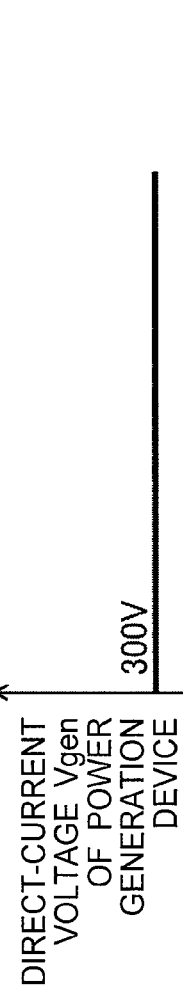
FIG.8C DIRECT-CURRENT VOLTAGE Vgen OF POWER GENERATION DEVICE
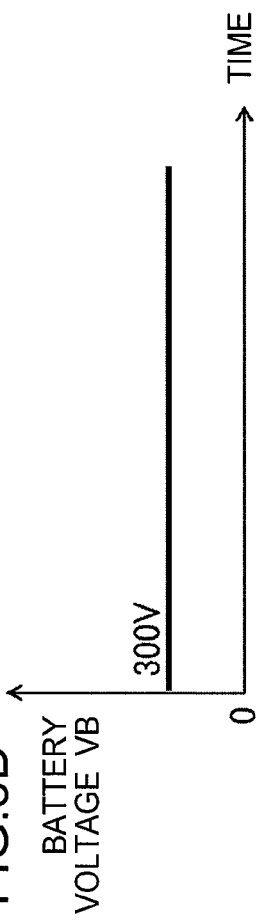
FIG.8D BATTERY VOLTAGE VB

VEHICLE
SPEED VS

BUS VOLTAGE
Vbus

DIRECT-CURRENT
VOLTAGE Vgen
OF POWER
GENERATION
DEVICE

BATTERY
VOLTAGE VB

DRIVE SYSTEM AND DRIVE CONTROL METHOD

TECHNICAL FIELD

The present invention relates to a drive system and a drive control method for drive control of a drive device and a power generation device, which are applied to, for example, a drive mechanism for an electric vehicle and a hybrid vehicle.

BACKGROUND ART

For example, in a related-art electric vehicle drive system of Patent Literature 1 described below, there is proposed a system in which a boost converter is arranged between a battery and a motor to cover a drive region with use of a small-size motor without increasing the number of series-connected cells of a battery.

Further, in Patent Literature 2 described below, there is proposed a system control method in which, through provision of a torque determination value to be used at the time of switching between a series connection and a parallel connection of a plurality of batteries, the number of times of switching between the series connection and the parallel connection is reduced to extend the life of a capacitor.

CITATION LIST

Patent Literature

[PTL 1] WO 2008/062590 A1
[PTL 2] JP 2010-183768 A

SUMMARY OF INVENTION

Technical Problem

In such an electric vehicle as described in Patent Literature 1, an additional component, that is, a boost converter is required. Output that is equivalent to those of a motor and an inverter is required for the boost converter. An effect achieved through downsizing of a motor is thus canceled out by the addition of the boost converter, with the result that the effect of downsizing of a drive system is reduced. Further, the boost converter requires a constant switching operation of a power semiconductor switch and a boost reactor, and loss occurs in both of the constant switching operation and the boost reactor. Thus, cooling equivalent to that for the motor and the inverter is required.

Meanwhile, in Patent Literature 2, there is described a method involving switching between the series connection and the parallel connection of the batteries to increase the operation range of the motor. In this method, there is a problem in that the size of a reactor is increased in order to suppress an inrush current to the capacitor, which is generated by on/off switching of a power semiconductor switch. Further, the state in which the batteries are connected in series corresponds to the use of a single high-voltage battery, and hence there is another problem in that the operation range of the motor cannot be increased with the device having such a configuration.

The present invention has been made to solve the above-mentioned problems, and has an object to obtain a drive system that has a simpler structure and can be downsized without use of a boost converter and without switching between a series connection and a parallel connection of a plurality of batteries, and a drive control method.

Solution to Problem

According to one embodiment of the present invention, there is provided, for example, a drive system including: a battery; a power generation device including: a power generator mounted to a shaft of an engine; and an inverter configured to convert an alternating-current voltage of the power generator into a direct-current voltage; a drive device including: a motor configured to drive a driven component; and an inverter configured to perform bi-directional conversion between an alternating-current voltage of the motor and a direct-current voltage; a switching device including a plurality of change-over switches configured to switch a connection of the battery and the power generation device at both ends of the drive device between a series connection and a parallel connection for connection; a reactor arranged between the battery and the switching device or between the power generation device and the drive device; and a control unit configured to control each of the switching device, the power generation device, and the drive device, wherein the control unit is configured to; use, when a speed of the driven component is being changed, the switching device to fix the connection of the battery and the power generation device to any one of the series connection and the parallel connection after alternately switching the connection between the series connection and the parallel connection; and use an efficiency map, in which an efficiency obtained by multiplying a revolution number of the motor and a torque of the motor by an efficiency of the engine, an efficiency of the power generator, and an efficiency of the inverter is defined in advance, to determine a revolution number of the engine based on a battery voltage of the battery.

Advantageous Effects of Invention

In one embodiment of the present invention, the connection relationship between the battery and the power generation device as seen from the drive device is controlled to be any one of the series connection and the parallel connection. Thus, it is possible to provide the drive system that has a simpler structure and can be downsized and the drive control method, which are capable of downsizing the motor without increasing at least one of the capacity of the battery or the number of series-connected cells.

BRIEF DESCRIPTION OF DRAWINGS

FIGS. 7A and 7B are schematic diagrams for illustrating examples of hardware configurations of the control unit of the drive system for a vehicle according to each of the first and second embodiments the present invention.

FIGS. 8A to 8D are timing charts for schematically illustrating each piece of vehicle condition information in the drive system for a vehicle according to the first embodiment of the present invention.

DESCRIPTION OF EMBODIMENTS

According to one embodiment of the present invention, a connection relationship between a battery and a power generation device as seen from a drive device is controlled to be any one of a series connection and a parallel connection, to thereby be able to downsize a motor without increasing at least one of the capacity of the battery or the number of series-connected cells.

Further, a power semiconductor switch included in a switching device performs a switching operation only during a change-over operation of the switching device, and hence switching loss of the power semiconductor switch and iron loss of a reactor can be reduced, and the size of a cooling device can be reduced.

Moreover, through control of a voltage applied to a capacitor, an inrush current can be suppressed, and hence the reactor can be downsized.

In this manner, a marked effect of being able to downsize the system is achieved.

The range of application of a drive system and a drive control method according to the present invention is not limited to an automobile. For example, the present invention is applicable to a train, or in a broader sense, to a device including a drive and power-generation mechanism configured to drive a driven component with use of a drive device to which a battery and a power generation device are connected.

Now, description is made of the drive system and the drive control method according to embodiments of the present invention with reference to the drawings. In the embodiments, description is made of an exemplary case in which the present invention is applied to an electric vehicle or a hybrid vehicle, which is representative. In the embodiments, the same or corresponding components are denoted by the same reference symbols, and redundant description is omitted.

First Embodiment

Figure 1:
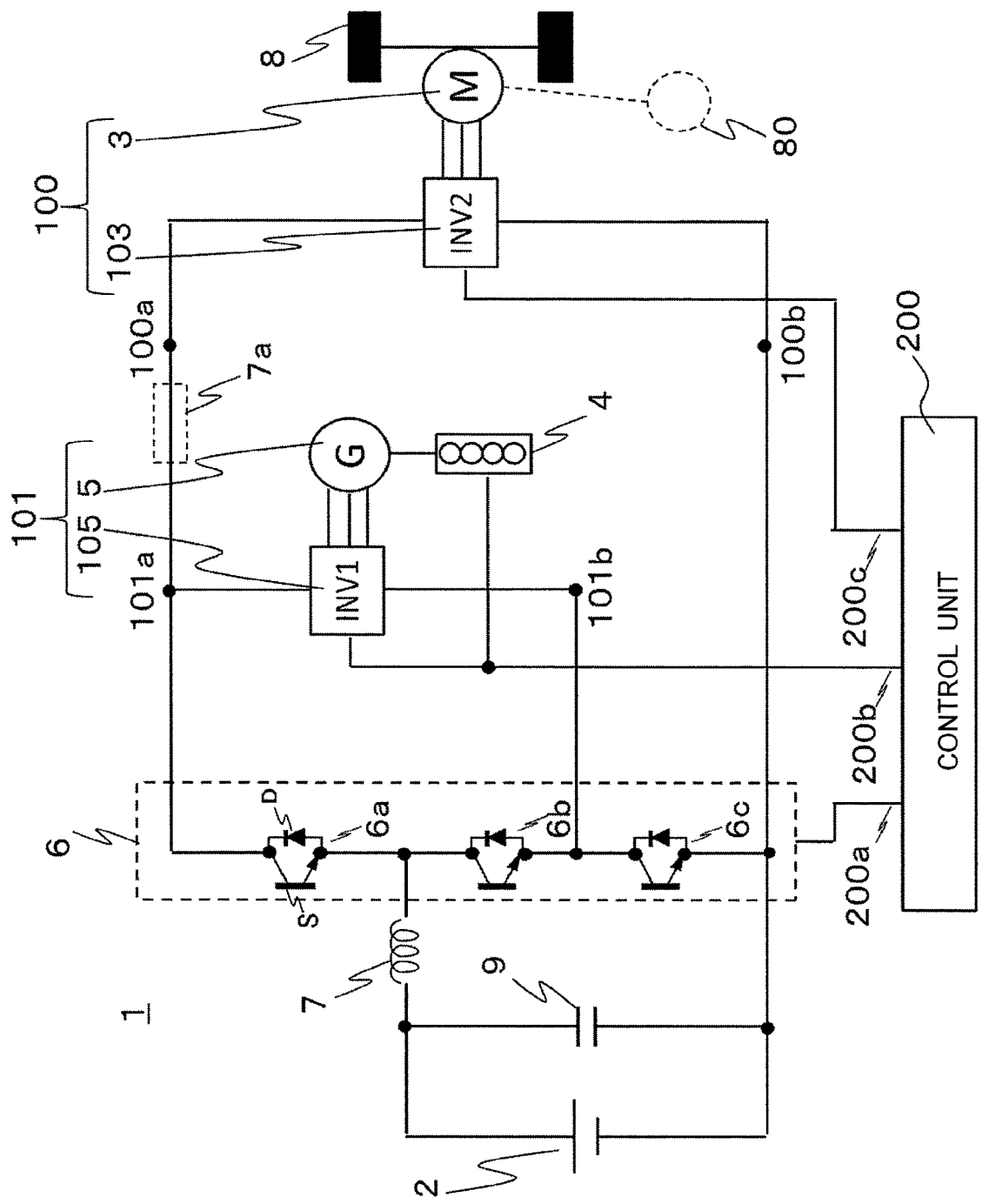
FIG. 1 is a configuration diagram of an example of a drive system for a vehicle according to each of first and second embodiments of the present invention.
Figure 2:
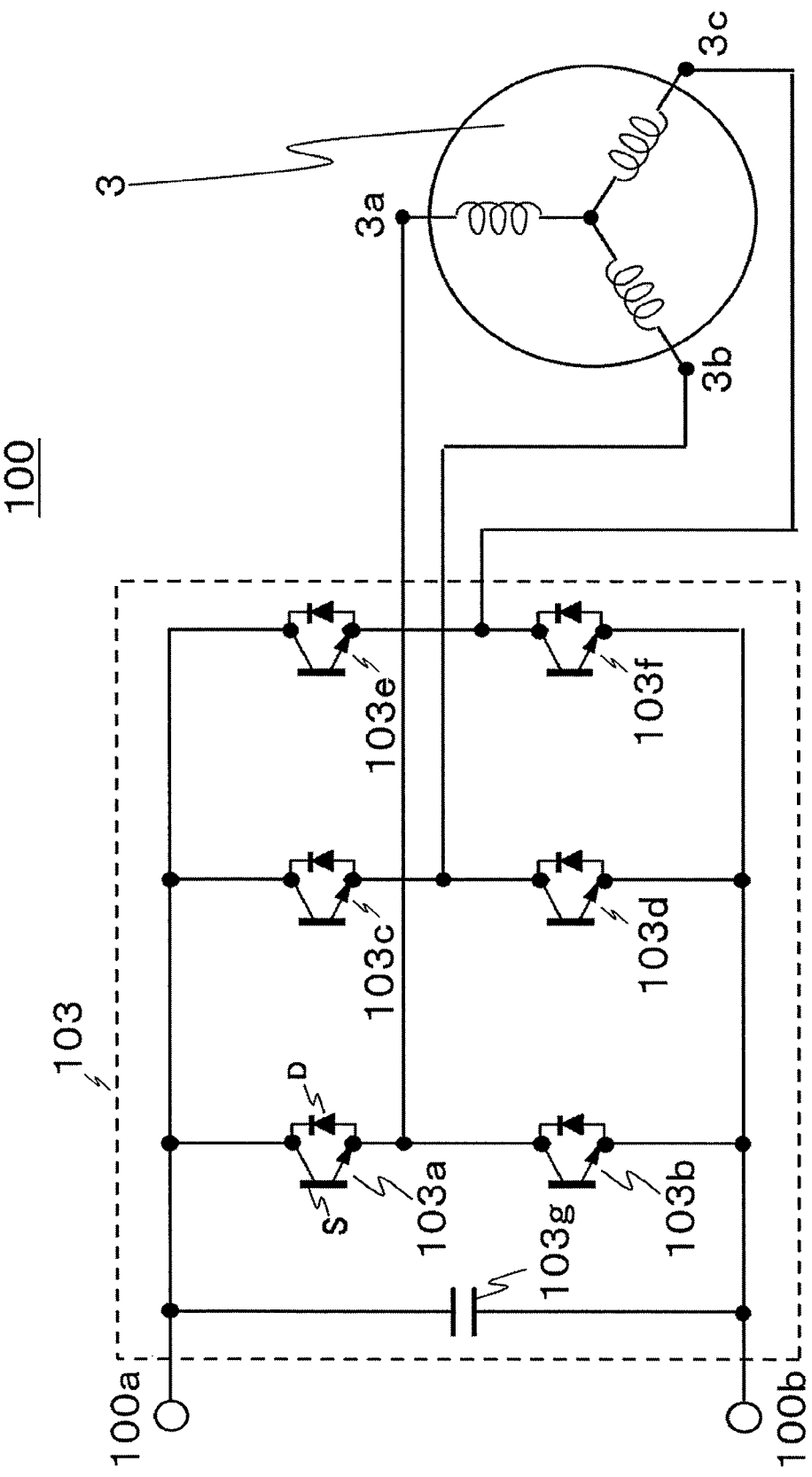
FIG. 2 is a configuration diagram of an example of a drive device of FIG. 1 in the present invention.
Figure 3:
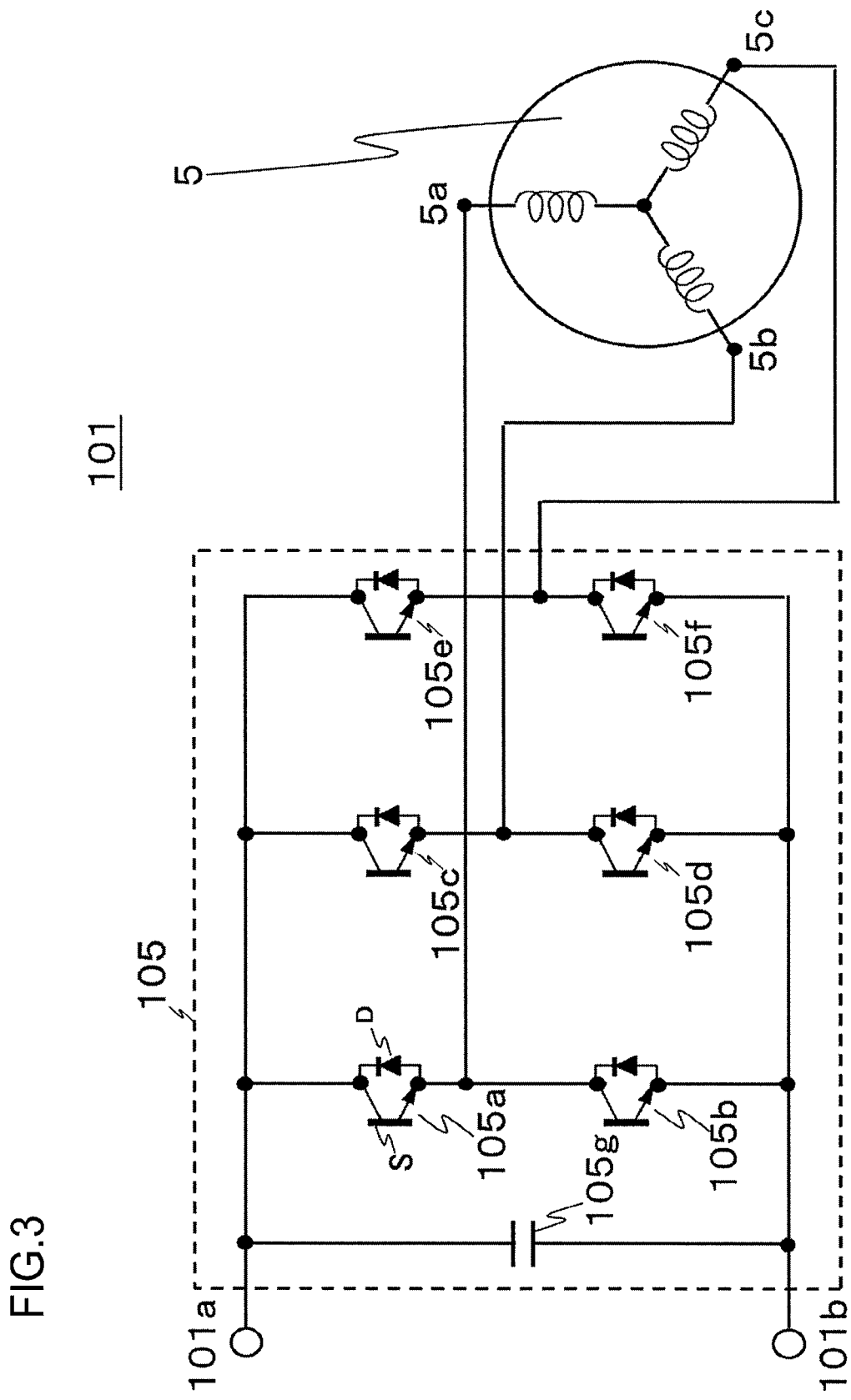
FIG. 3 is a configuration diagram of an example of a power generation device of FIG. 1 in the present invention.

FIG. 1 is a diagram for illustrating a configuration of a drive system for a vehicle according to each of first and second embodiments of the present invention. FIG. 2 is a diagram for illustrating an example of a configuration of a drive device 100 of FIG. 1, and FIG. 3 is a diagram for illustrating an example of a configuration of a power generation device 101 of FIG. 1. In the drive system 1 for a vehicle of FIG. 1, a battery 2 is a direct-current electricity storage device using a lithium ion battery or a nickel-metal hydride battery, for example. The battery 2 has one terminal connected to one terminal of a capacitor 9, and the battery 2 has another terminal connected to another terminal of the capacitor 9.

A switching device 6 includes three power semiconductor switches 6a, 6b, and 6c, in each of which a semiconductor switch S and a free-wheeling diode D are connected in parallel. The power semiconductor switch 6a has a collector terminal connected to one terminal 101a of a capacitor 105g included in an inverter 105 illustrated in FIG. 3, and to one terminal 100a of a capacitor 103g included in an inverter 103 illustrated in FIG. 2. The power semiconductor switch 6a has an emitter terminal connected to a collector terminal of a power semiconductor switch 6b. The power semiconductor switch 6b has an emitter terminal connected to a collector terminal of the power semiconductor switch 6c, and a connection point between the terminals is connected to another terminal 101b of the capacitor 105g included in the inverter 105. The power semiconductor switch 6c has an emitter terminal connected to the other terminal of the capacitor 9 and to another terminal 100b of the capacitor 103g included in the inverter 103.

The drive device 100 is connected to the battery 2 via the switching device 6. The drive device 100 includes the inverter 103 (INV2) configured to perform mutual conversion from direct-current power to alternating-current power and from alternating-current power to direct-current power, and a motor 3 (M) being an electric motor, more specifically, a generator-motor. The motor 3 is configured to convert alternating-current power into mechanical energy to rotationally drive drive wheels 8 of the vehicle, and to convert rotational energy of the drive wheels 8 of the vehicle into direct-current power to supply the direct-current power to the battery 2. The drive wheels 8 correspond to a driven component in the case of a drive system for an automobile. A general driven component other than that of an automobile is illustrated symbolically as a driven component 80 by the broken lines.

The power generation device 101 includes an engine 4, a generator 5 (G) being a power generator mounted to an engine shaft and configured to convert mechanical energy into electrical energy, and the inverter 105 (INV1) connected to the battery 2 via the switching device 6 and configured to convert alternating-current power into direct-current power.

The motor 3 and the generator 5 are each a magnet-embedded three-phase synchronous motor in which a permanent magnet is provided in a rotor. However, for example, an induction motor or a synchronous reluctance motor may be used.

The engine 4 is connected to the generator 5, but is not connected to the drive wheels 8 of the vehicle.

The reactor 7 has one terminal connected to the one terminal of the capacitor 9, and the reactor 7 has another terminal connected to a connection point between the emitter terminal of the power semiconductor switch 6a and the collector terminal of the power semiconductor switch 6b.

In the drive device 100 of FIG. 2, in the inverter 103, an emitter terminal of a power semiconductor switch 103a and a collector terminal of a power semiconductor switch 103b are connected to each other, an emitter terminal of a power semiconductor switch 103c and a collector terminal of a power semiconductor switch 103d are connected to each other, and an emitter terminal of a power semiconductor switch 103e and a collector terminal of a power semiconductor switch 103f are connected to each other. A collector terminal of the power semiconductor switch 103a, a collector terminal of the power semiconductor switch 103c, and a collector terminal of the power semiconductor switch 103e are connected to one another, and those collector terminals are connected to the one terminal of the capacitor 103g. An emitter terminal of the power semiconductor switch 103b, an emitter terminal of the power semiconductor switch 103d, and an emitter terminal of the power semiconductor switch 103f are connected to one another, and those emitter terminals are connected to the other terminal of the capacitor 103g.

A terminal 3a of a coil of one of three phases of the motor 3 is connected to a connection point between the emitter terminal of the power semiconductor switch 103a and the collector terminal of the power semiconductor switch 103b. Terminals 3b and 3c of coils of the other two phases are connected to a connection point between the emitter terminal of the power semiconductor switch 103c and the collector terminal of the power semiconductor switch 103d and to a connection point between the emitter terminal of the power semiconductor switch 103e and the collector terminal of the power semiconductor switch 103f, respectively.

In the power generation device 101 of FIG. 3 in the inverter 105, an emitter terminal of a power semiconductor switch 105a and a collector terminal of a power semiconductor switch 105b are connected to each other, an emitter terminal of a power semiconductor switch 105c and a collector terminal of a power semiconductor switch 105d are connected to each other, and an emitter terminal of a power semiconductor switch 105e and a collector terminal of a power semiconductor switch 105f are connected to each other. A collector terminal of the power semiconductor switch 105a, a collector terminal of the power semiconductor switch 105c, and a collector terminal of the power semiconductor switch 105e are connected to one another, and those collector terminals are connected to the one terminal of the capacitor 105g. An emitter terminal of the power semiconductor switch 105b, an emitter terminal of the power semiconductor switch 105d, and an emitter terminal of the power semiconductor switch 105f are connected to one another, and those emitter terminals are connected to the other terminal of the capacitor 105g.

A terminal 5a of a coil of one of three phases of the generator 5 is connected to a connection point between the emitter terminal of the power semiconductor switch 105a and the collector terminal of the power semiconductor switch 105b. Terminals 5b and 5c of coils of the other two phases are connected to a connection point between the emitter terminal of the power semiconductor switch 105c and the collector terminal of the power semiconductor switch 105d and to a connection point between the emitter terminal of the power semiconductor switch 105e and the collector terminal of the power semiconductor switch 105f, respectively.

The power semiconductor switches S included in the switching device 6, the inverter 103, and the inverter 105 are each an insulated gate bipolar transistor (IGBT), and the free-wheeling diode D is connected in parallel to each power semiconductor switch S. As the power semiconductor switch, a field effect transistor (MOSFET), a silicon carbide transistor, or a silicon carbide MOSFET may also be used.

The switching device 6, the drive device 100, and the power generation device 101 each have a control function. The respective devices are connected to a terminal 200a, a terminal 200b, and a terminal 200c of a control unit 200 configured to issue an instruction on an operation state to each device.

The control unit 200 controls the drive device 100 and the power generation device 101, and controls opening and closing of each of the power semiconductor switches 6a, 6b, and 6c included in the switching device 6, in accordance with various conditions of the vehicle based on vehicle condition information VCI. The control unit 200 controls opening and closing of each of the power semiconductor switches 6a, 6b, and 6c included in the switching device 6 in this manner, to thereby switch the connection of the battery 2 and the power generation device 101 between the series connection and the parallel connection as seen from the drive device 100. A block diagram of functions around the control unit 200 is illustrated in FIG. 6.

Figure 6:
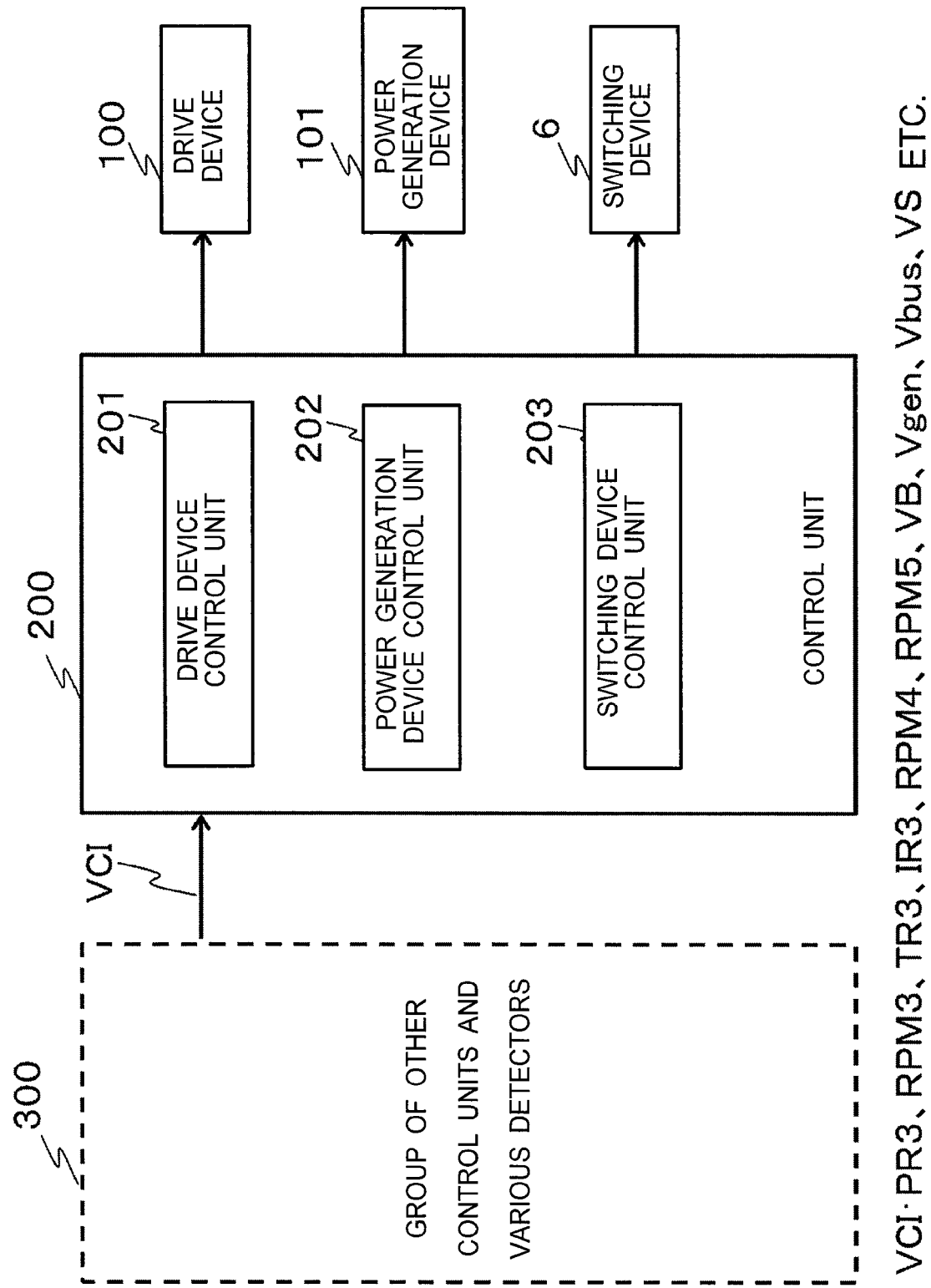
FIG. 6 is a block diagram of functions around a control unit of the drive system for a vehicle according to each of the first and second embodiments of the present invention.

In FIG. 6, the control unit 200 includes a drive device control unit 201, a power generation device control unit 202, and a switching device control unit 203, which are configured to control the drive device 100, the power generation device 101, and the switching device 6, respectively. Further, although a detailed illustration is omitted, in accordance with the vehicle condition information VCI given by a group 300 of other control units and various detectors constructed by detectors and other control units provided at various locations in the vehicle, the control unit 200 controls the drive device 100, the power generation device 101, and the switching device 6.

Examples of the vehicle condition information VCI given by the group 300 of other control units and various detectors include direct-current voltages VB, Vgen, and Vbus of the battery 2, the power generation device 101, and the drive device 100, respectively, which are sent from various detectors, and a vehicle speed VS, a power PR3 required for the motor 3, a revolution number RPM3, a torque TR3, a current IR3, a revolution number RPM4 of the engine 4, and a revolution number RPM5 of the generator 5, which are sent from other control units. Those pieces of information are actually sent to the control unit 200 as signals indicating the respective values.

FIG. 7A is a schematic illustration of a case in which, for example, each of the functions of the control unit 200 illustrated in FIG. 6 is constructed of hardware, and FIG. 7B is a schematic illustration of a hardware configuration in a case where each of the functions is constructed of software.

When the function of each of the above-mentioned units is constructed of the hardware illustrated in FIG. 7A, a processing circuit 2000 corresponds to, for example, a single circuit, a composite circuit, a programmed processor, a parallel-programmed processor, an ASIC, or an FPGA, or a combination of those. The function of each of the above-mentioned units may be implemented by a processing circuit, or the functions of the respective units may collectively be implemented by a processing circuit.

When the function of each of the above-mentioned units is constructed of a CPU illustrated in FIG. 7B, the function of each of the above-mentioned units is implemented by software, firmware, or a combination of software and firmware. Software, firmware, or the like is described as a program to be stored into a memory 2002. A processor 2001 serving as a processing circuit reads out and executes the program stored in the memory 2002, to thereby implement the function of each of the units. Those programs are, in other words, programs for causing a computer to execute the procedure and method of each of the above-mentioned units. On this occasion, the memory 2002 corresponds to, for example, a nonvolatile or volatile semiconductor memory such as a RAM, a ROM, a flash memory, an EPROM, and an EEPROM, a magnetic disk, a flexible disk, an optical disc, a compact disc, a mini disc, or a DVD.

The function of each of the above-mentioned units may partially be implemented by dedicated hardware, and may partially be implemented by software or firmware.

In this way, the processing circuit can implement each of the above-mentioned functions by hardware, software, firmware, or a combination of those.

Further, various types of information required for processing are set in advance in a circuit in the case of a hardware configuration, and are stored in advance into a memory in the case of a software configuration.

Figure 4:
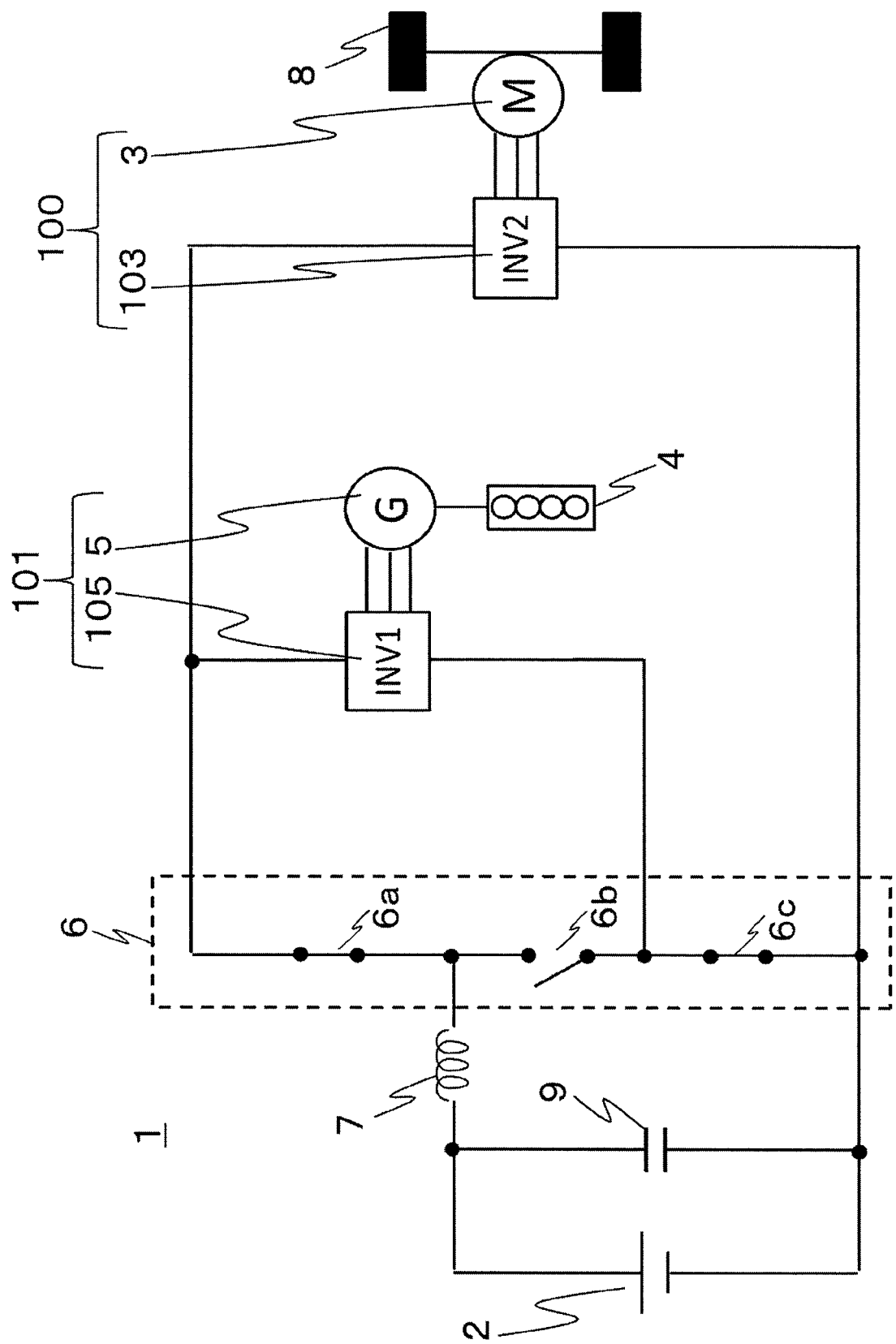
FIG. 4 is a diagram for illustrating a circuit state of a parallel connection in the drive system for a vehicle of FIG. 1 according to the present invention.

FIG. 4 is a diagram for illustrating the parallel connection in the drive system for a vehicle of FIG. 1. The power semiconductor switches 6a and 6c included in the switching device 6 are each turned on, that is, brought into a conductive state, and the power semiconductor switch 6b is turned off, that is, brought into a cut-off state. As a result, the battery 2 and the power generation device 101 are connected in parallel to each other as seen from the drive device 100.

Figure 5:
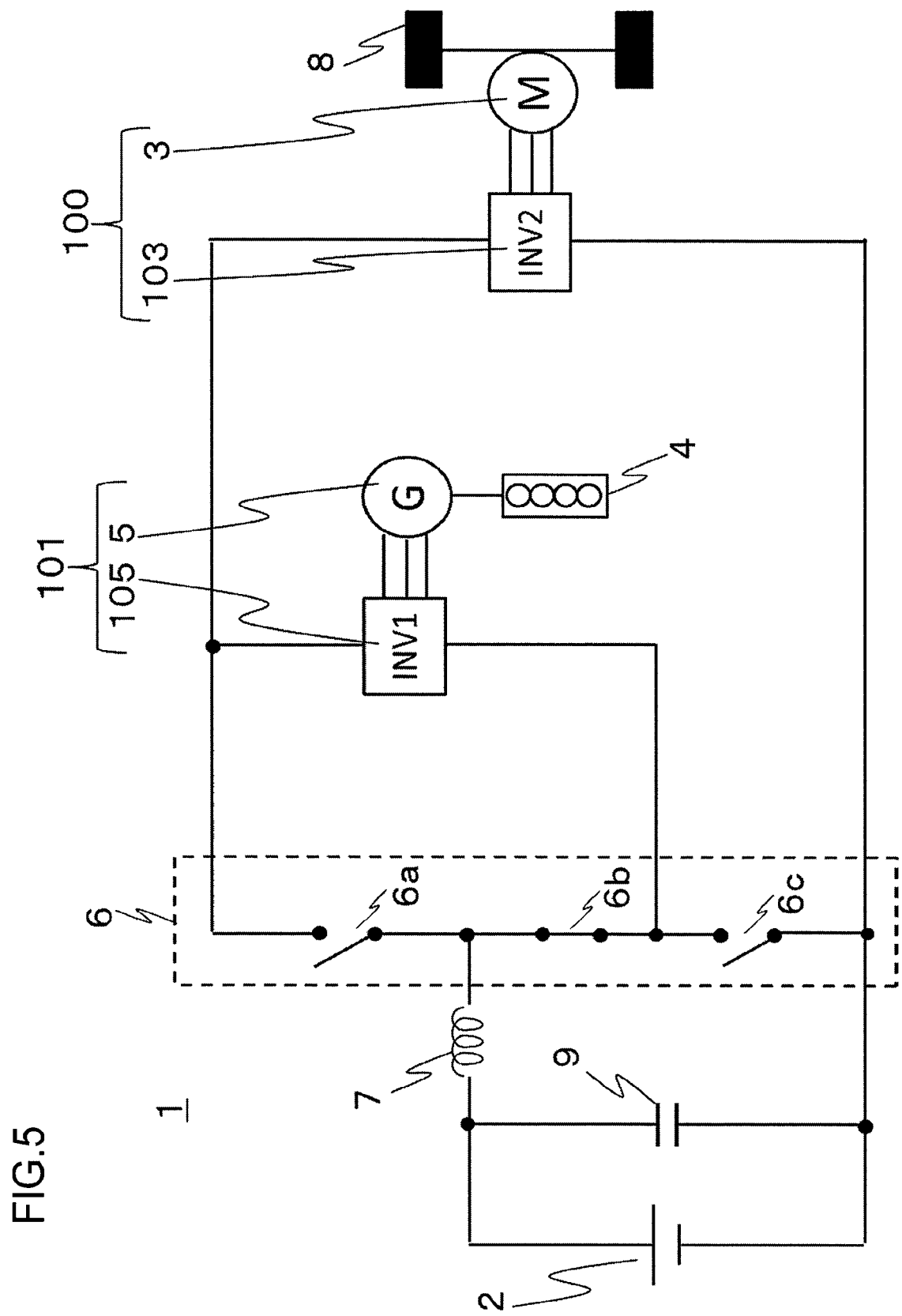
FIG. 5 is a diagram for illustrating a circuit state of a series connection in the drive system for a vehicle of FIG. 1 according to the present invention.

FIG. 5 is a diagram for illustrating the series connection in the drive system for a vehicle of FIG. 1. The power semiconductor switches 6a and 6c included in the switching device 6 are each turned off, and the power semiconductor switch 6b is turned on. As a result, the battery 2 and the power generation device 101 are connected in series to each other as seen from the drive device 100.

FIGS. 8A to 8D are timing charts for schematically illustrating each piece of vehicle condition information in the drive system for a vehicle according to the first embodiment of the present invention. In FIGS. 8A to 8D, a vehicle speed VS is illustrated in FIG. 8A, the bus voltage Vbus being the direct-current voltage of the inverter 103 included in the drive device 100 is illustrated in FIG. 8B, the power generation voltage Vgen being the direct-current voltage of the inverter 105 included in the power generation device 101 is illustrated in FIG. 8C, and the direct-current voltage VB of the battery 2 is illustrated in FIG. 8D. The "bus" herein refers to, as illustrated in FIG. 1, two positive and negative connection lines, which connect the inverter 105 and the battery 2 via the switching device 6, and on which the terminals 100a and 100b are illustrated.

An operation of the system in each vehicle state is described with reference to FIGS. 8A to 8D.

A first vehicle state is a state at the time of "motor start". The "motor start" refers to rotationally driving the drive wheels 8 of the vehicle by the motor 3 under a state in which the vehicle is stopped to wait for traffic lights to change, for example. The "motor start" state corresponds to an early stage of a rising portion of the vehicle speed VS of FIG. 8A. In the "motor start" state, in order to set the bus voltage to a low voltage, the battery 2 and the power generation device 101 are connected in parallel to each other as seen from the drive device 100 as illustrated in FIG. 4. Electric power is thus supplied to the drive device 100 from both the battery 2 and the power generation device 101.

At this time, the sharing of the load between the battery 2 and the generator 5 is determined in accordance with a predetermined map stored in advance, for example, in the memory 2002 illustrated in FIG. 7B so that the power-generation efficiency of the engine 4, the generator 5, and the inverter 105 is maximized (Step S6). At this time, the direct-current voltage Vgen of the inverter 105 becomes equal to, for example, 300 V, which is the direct-current voltage VB of the battery 2. The predetermined map is used after being corrected by the direct-current voltage VB of the battery 2 given at this time. The map to be used is an efficiency map which is obtained by multiplying the revolution number RPM 3 of the motor 3 and the torque TR3 by an efficiency of the engine 4, an efficiency of the generator 5, and an efficiency of the inverter 105, and the revolution number of the engine 4 is determined so that the efficiency of a required output is maximized. That is, in this case, the revolution number RPM4 of the engine 4 is adjusted in accordance with the revolution number RPM3 and the torque TR3 required for the motor 3 and the voltage VB of the battery.

In the case of the processing circuit 2000 of FIG. 7A, the function of the above-mentioned map is set in advance in the circuit, and the processing is performed in the same manner. For the convenience of description, the following description deals with the case of the software configuration of FIG. 7B, but the same applies to the case of the hardware configuration of FIG. 7A.

The power-generation efficiency of the power generation device is maximized under the "motor start" state, and thus an amount of gasoline required for power generation is reduced. As a result, energy saving can be achieved.

Further, through setting of the bus voltage to a low voltage, an excessive current can be prevented from flowing through the inverter 105 and the motor 3 included in the drive device 100 at the time of the motor start. As a result, damage to the inverter and the motor can be avoided.

Further, in the related-art system in which the series connection and the parallel connection of the plurality of batteries are switched, the adjustment of the balance among battery voltages is performed for a few hours in order to connect the batteries in parallel. In contrast, in the first embodiment, the direct-current voltage Vgen of the power generation device 101 can be adjusted in a few seconds so as to follow the direct-current voltage VB of the battery 2, and hence it is possible to allow the adjustment of the balance among voltages to follow the operation of the system.

Further, the related-art system in which the series connection and the parallel connection of the plurality of batteries are switched is designed so that the system can be operated in a required operation region even when the direct-current voltage VB of the battery 2 decreases, and hence the motor 3 is designed with over performance. In contrast, in the first embodiment, in order to prevent the direct-current voltage VB of the battery 2 from decreasing, the revolution number RPM4 of the engine 4 and the revolution number RPM5 of the generator 5 are increased, that is, the direct-current voltage Vgen of the power generation device 101 is increased. Through compensation of the direct-current voltage in such a manner, the performance required for the motor 3 is moderated, to thereby be able to downsize the motor 3.

Next, a second vehicle state is a state at the time of "motor acceleration". The "motor acceleration" state corresponds to a stage after the early stage of the rising portion of the vehicle speed VS of FIG. 8A. The "motor acceleration" refers to causing the switching device 6 and the power generation device 101 to cooperatively operate so as to increase the bus voltage Vbus, to thereby supply high power to the drive device 100 to generate torque. In the "motor acceleration" state, while the direct-current voltage Vgen of the power generation device 101 is adjusted by the control unit 200 to be equal to the direct-current voltage VB of the battery 2, the connection of the battery 2 and the power generation device 101 at both ends of the drive device 100 is fixed to the series connection by the switching device 6 after the parallel connection and the series connection are alternately repeated. More specifically, the connection of the battery 2 and the first inverter 105 of the power generation device 101 at both ends of the second inverter 105 of the drive device 100 is fixed to the series connection after the parallel connection and the series connection are alternately repeated. A similar operation is performed after that. The bus voltage Vbus at this time is increased from 300 V to 600 V, for example.

As described above, only during the change-over operation of the switching device 6, the power semiconductor switches 6a to 6c included in the switching device 6 perform the switching operation. As a result, the switching loss of the power semiconductor switches 6a to 6c and iron loss of the reactor 7 are not generated except for the change-over operation of the switching device 6, and hence the size of the cooling device can be reduced.

Further, in the related-art system in which the series connection and the parallel connection of the plurality of batteries are switched, a reactor is used in order to suppress an inrush current to the capacitor due to the series connection of the battery. In contrast, in the first embodiment, the bus voltage can be controlled to have a ramp shape, and hence the reactor 7 can be downsized.

In this manner, according to the first embodiment, a marked effect of being able to downsize the system is achieved.

Further, a third vehicle state is a state at the time of "motor constant-speed running". The "motor constant-speed running" state corresponds to a constant-speed portion after the rising portion of the vehicle speed VS of FIG. 8A. The "motor constant-speed running" refers to applying a constant voltage to the motor 3 based on an induced voltage of the motor 3 generated by the rotational drive of the drive wheels 8 of the vehicle, to thereby rotationally drive the motor 3 at a constant speed.

At this time, the direct-current voltage of the drive device 100, that is, the bus voltage Vbus, becomes a total value of the direct-current voltage VB of the battery 2 and the direct-current voltage Vgen of the power generation device 101, which is 600 V, for example. When the direct-current voltage VB of the battery 2 decreases in this case, in order to increase the direct-current voltage Vgen of the power generation device 101, the revolution number RPM4 of the engine 4 and the revolution number RPM5 of the generator 5 are increased.

In general, the related-art system in which the drive device 100 operates with only the battery 2 as a direct power supply is designed so that the system can be operated in a required operation region even when the direct-current voltage VB of the battery 2 decreases, and hence the motor 3 is designed with over performance. In contrast, in the first embodiment, through compensation of the direct-current voltage in the above-mentioned manner, the performance required for the motor 3 is moderated, to thereby be able to downsize the motor 3.

Next, a fourth vehicle state is a state at the time of "deceleration energy regeneration". The "deceleration energy regeneration" state corresponds to a falling portion of the vehicle speed VS of FIG. 8A. In the "deceleration energy regeneration", regenerative energy of the drive device 100 is collected into the battery 2, to thereby reduce an amount of gasoline required for power generation. As a result, energy saving can be achieved. In the "deceleration energy regeneration" state, the connection of the battery 2 and the power generation device 101 is fixed to the parallel connection by the switching device 6 after the series connection and the parallel connection are alternately repeated. The bus voltage Vbus at this time is decreased from 600 V to 300 V, for example.

As a result, overcurrent to the battery 2 can be suppressed, and hence damage to the battery 2 can be prevented.

Further, at the time of deceleration energy regeneration at the time when the battery 2 and the power generation device 101 are connected in series, the operation of the inverter 105 is stopped. After that, under a state in which the inverter 105 is kept being stopped, the connection of the battery 2 and the power generation device 101 is fixed to the parallel connection by the switching device 6 after the series connection and the parallel connection are alternately repeated.

As a result, the loss of the inverter 105 configured to convert the alternating-current voltage of the power generator into the direct-current voltage can be reduced, and hence regenerative energy can be actively collected into the battery 2. That is, an amount of gasoline required for power generation can be further reduced. As a result, further energy saving can be achieved.

In the above description of the first embodiment of the present invention, as illustrated in FIG. 1, the reactor 7 is connected between the one terminal of the capacitor 9 and the connection point between the emitter terminal of the power semiconductor switch 6a and the collector terminal of the power semiconductor switch 6b. However, the same effect can be obtained even when a reactor 7a is connected between the collector terminal of the power semiconductor switch 105e of the inverter 105 illustrated in FIG. 3 and included in the power generation device 101 and the one terminal of the capacitor 105g illustrated in FIG. 2 and included in the drive device 100, that is, between the power generation device 101 and the drive device 100 as indicated by the broken line in FIG. 1.

In the above description of the first embodiment of the present invention, the inverter 105 and the motor 3 included in the drive device 100, and the inverter 105 and the generator 5 included in the power generation device 101 each employ a circuit including a single set of three-phase windings. It is to be understood, however, that the same effect can be obtained even when a circuit including two or more sets of three-phase windings is employed.

Second Embodiment

Now, a drive system for a vehicle according to a second embodiment of the present invention is described. A configuration diagram of the drive system for a vehicle according to the second embodiment of the present invention is basically the same as that of FIG. 1 referred to in the first embodiment. The difference from the first embodiment resides in control of the switching device 6 and the power generation device 101 at the time of "motor acceleration", which corresponds to the rising portion of the vehicle speed VS of FIG. 8A for illustrating the vehicle states, and at the time of "deceleration energy regeneration", which corresponds to the falling portion of the vehicle speed VS.

Figure 9A:
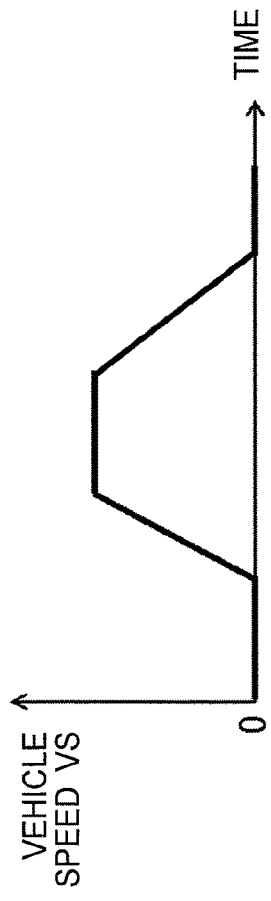
FIGS. 9A to 9D are timing charts for schematically illustrating each piece of vehicle condition information in the drive system for a vehicle according to the second embodiment of the present invention.
Figure 9B:
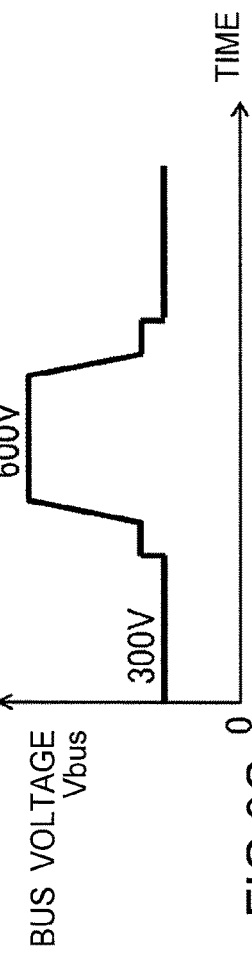
Figure 9C:
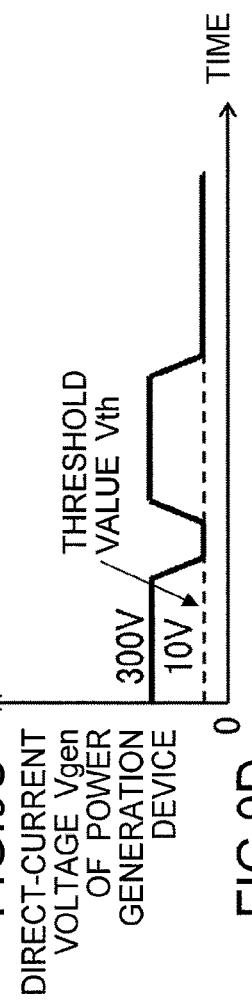
Figure 9D:
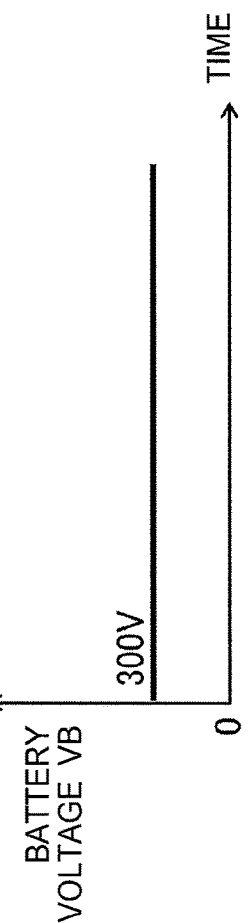

FIGS. 9A to 9D are timing charts for schematically illustrating each piece of vehicle condition information in the drive system for a vehicle according to the second embodiment of the present invention. In FIGS. 9A to 9D, the vehicle speed VS is illustrated in FIG. 9A, the bus voltage Vbus being the direct-current voltage of the inverter 103 included in the drive device 100 is illustrated in FIG. 9B, the power generation voltage Vgen being the direct-current voltage of the inverter 105 included in the power generation device 101 is illustrated in FIG. 9C, and the direct-current voltage VB of the battery 2 is illustrated in FIG. 9D. Next, an operation of the switching device 6 and the power generation device 101 in each vehicle state is described with reference to FIGS. 9A to 9D.

In the first embodiment, at the time of "motor acceleration", which corresponds to the stage after the early stage of the rising portion of the vehicle speed VS of FIG. 8A, while the direct-current voltage Vgen of the power generation device 101 is adjusted by the control unit 200 to be equal to the direct-current voltage VB of the battery 2, the connection of the battery 2 and the power generation device 101 is fixed to the series connection by the switching device 6 after the parallel connection and the series connection are alternately repeated.

Figure 10:
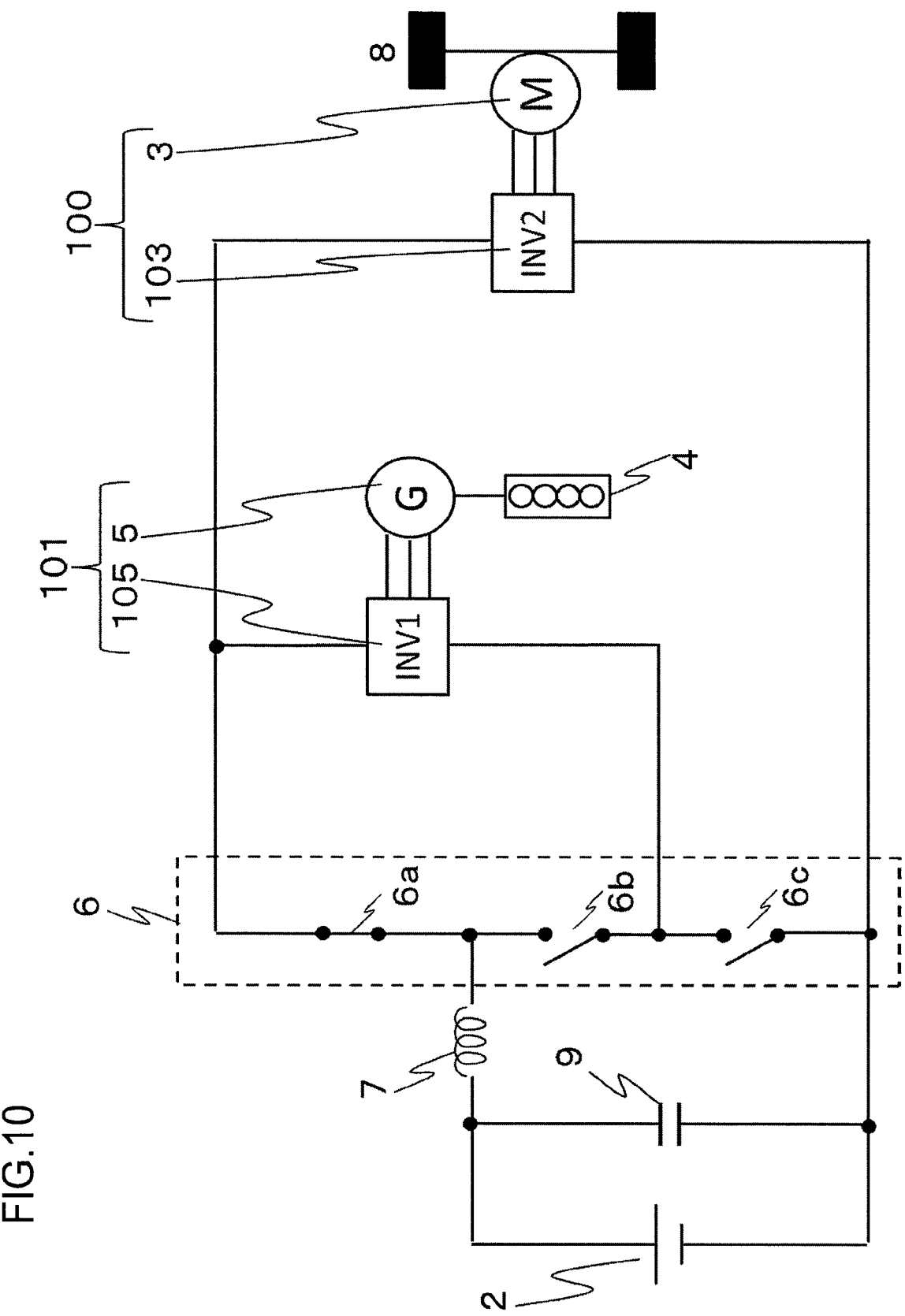
FIG. 10 is a diagram for illustrating a connection state in the drive system for a vehicle according to the second embodiment of the present invention.

In the second embodiment, in order to prevent the inrush current to the capacitor 105g of FIG. 2, which is generated when the connection is switched to the series connection by on/off control of the switching device 6, from exceeding an allowable value, a threshold value Vth is set to the direct-current voltage Vgen of the power generation device 101 as illustrated in FIG. 9C. In the second embodiment, the threshold value Vth is set to, for example, 10 V. After the switching device 6 performs on/off control to switch from the state illustrated in FIG. 4, in which the power semiconductor switches 6a and 6c are on and the power semiconductor switch 6b is off, to a state illustrated in FIG. 10, in which the power semiconductor switch 6a is on and the power semiconductor switches 6b and 6c are off, the power generation device 101 is controlled by the control unit 200 to have a voltage of 10 V. After that, the switching device 6 performs on/off control to switch to the state illustrated in FIG. 5, in which the power semiconductor switches 6a and 6c are off and the power semiconductor switch 6b is on. Further, the control unit 200 controls the power generation device 101 so that the direct-current voltage Vgen of the power generation device 101 increases from 10 V to 300 V.

In the first embodiment, at the time of "deceleration energy regeneration", which corresponds to the falling portion of the vehicle speed VS of FIG. 8A, the connection of the battery 2 and the power generation device 101 is fixed to the parallel connection by the switching device 6 after the series connection and the parallel connection are alternately repeated.

In the second embodiment, in order to prevent the inrush current to the capacitor 9, which is generated when the connection is switched to the parallel connection by the on/off control of the switching device 6, from exceeding the allowable value, as illustrated in FIG. 9C, the threshold value Vth, which is set in advance, is set to the direct-current voltage Vgen of the power generation device 101. In the second embodiment, the threshold value Vth, which is set in advance, is set to 10 V, for example. The power generation device 101 is controlled by the control unit 200 so that the direct-current voltage Vgen of the power generation device 101 is equal to or lower than the set threshold value Vth. After that, the switching device 6 performs on/off control to switch from the state in which the power semiconductor switches 6a and 6c are off and the power semiconductor switch 6b is on, to the state illustrated in FIG. 10, in which the power semiconductor switch 6a is on and the power semiconductor switches 6b and 6c are off.

As described above, only during the change-over operation of the switching device 6, the power semiconductor switches 6a to 6c included in the switching device 6 perform the switching operation. As a result, in the drive system for a vehicle according to the second embodiment, the switching loss of the power semiconductor switches 6a, 6b, and 6c included in the switching device 6 and iron loss of the reactor 7 can be reduced, and hence the drive system for a vehicle can be downsized.

In the above description of the second embodiment of the present invention, the power semiconductor switch S included in each of the switching device 6, the inverter 105, and the inverter 105 is an insulated gate bipolar transistor (IGBT), and the free-wheeling diode D is connected in parallel thereto. It is to be understood, however, that the same effect can be obtained even through use of a field effect transistor (MOSFET), a silicon carbide transistor, or a silicon carbide MOSFET.

In the above description of the second embodiment of the present invention, the reactor 7 is connected between the one terminal of the capacitor 9 and the connection point between the emitter terminal of the power semiconductor switch 6a and the collector terminal of the power semiconductor switch 6b. However, the same effect can be obtained even when the reactor 7a is connected between the collector terminal of the power semiconductor switch 105e of the inverter 105 illustrated in FIG. 3 and included in the power generation device 101 and the one terminal of the capacitor 105g illustrated in FIG. 2 and included in the drive device 100, that is, between the power generation device 101 and the drive device 100 as indicated by the broken line in FIG. 1.

Also in the above description of the second embodiment of the present invention, the inverter 105 and the motor 3 included in the drive device 100, and the inverter 105 and the generator 5 included in the power generation device 101 each employ a circuit including a single set of three-phase windings. It is to be understood, however, that the same effect can be obtained even when a circuit including two or more sets of three-phase windings is employed.

Third Embodiment

In the first and second embodiments described above, control is performed so that the power-generation efficiency of each of the engine 4, the generator 5, and the inverter 105 is maximized.

However, in the cases of the first and second embodiments described above, the power semiconductor switches 105a to 105f perform the switching operation. This operation causes the switching loss in the inverter 105. Further, the power semiconductor switch includes a switch and a diode, and hence the size of the inverter 105 is increased.

In contrast, in a third embodiment of the present invention, the switching loss is reduced, and the inverter is downsized. Now, a configuration and operation for achieving this are specifically described. A configuration diagram of a drive system for a vehicle according to the third embodiment is basically the same as that of FIG. 1 referred to in the first embodiment. The difference resides in that the inverter 105 is formed by diodes. An example of a configuration of a power generation device including the inverter 105 in the third embodiment of the present invention is illustrated in FIG. 11.

Figure 11:
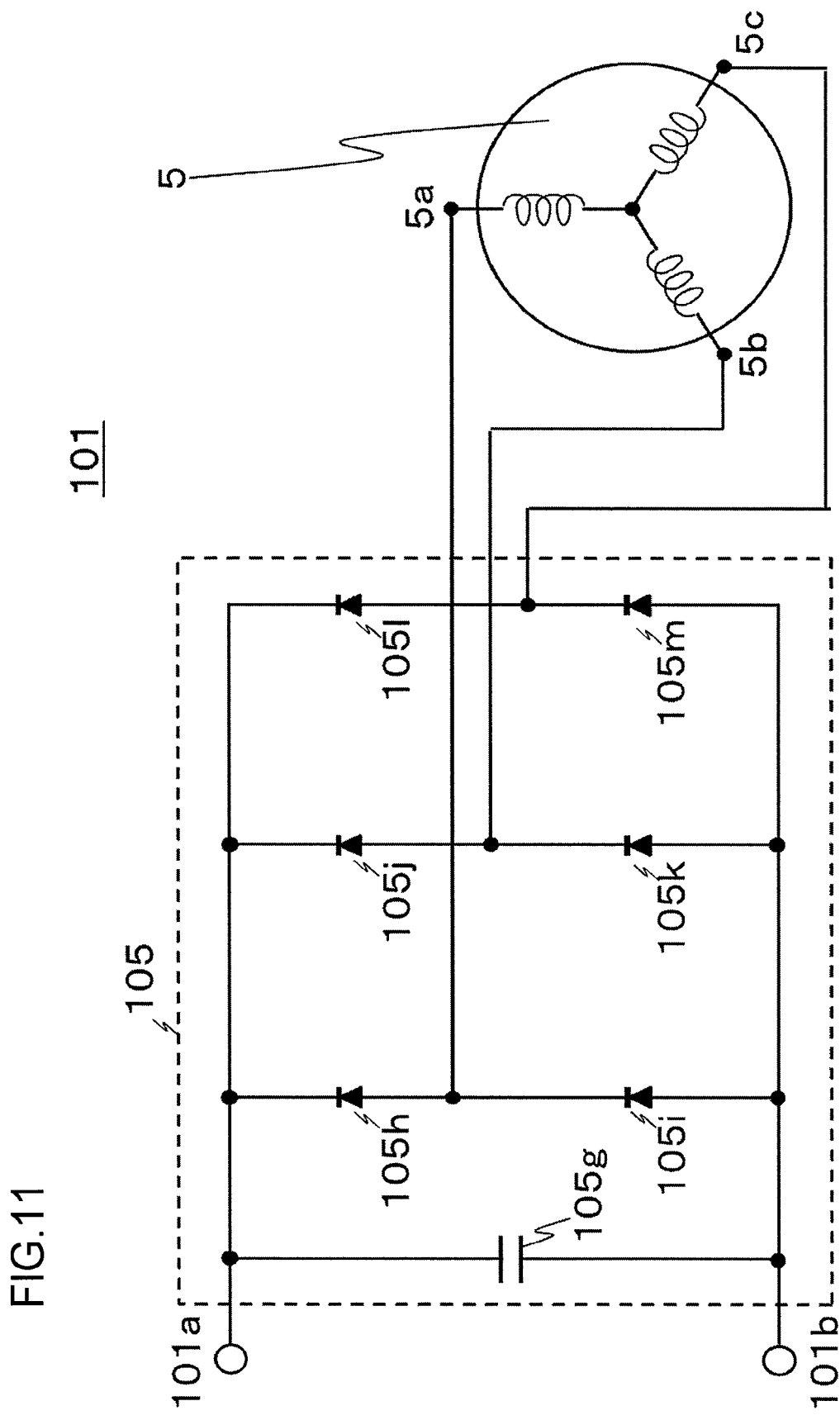
FIG. 11 is a configuration diagram of an example of a power generation device in a third embodiment of the present invention.

In the inverter 105 of FIG. 11, an anode terminal of a diode 105h and a cathode terminal of a diode 105i are connected to each other, an anode terminal of a diode 105j and a cathode terminal of a diode 105k are connected to each other, and an anode terminal of a diode 105l and a cathode terminal of a diode 105m are connected to each other. A cathode terminal of the diode 105h, a cathode terminal of the diode 105j, and a cathode terminal of the diode 105l are connected to one another, and those cathode terminals are connected to the one terminal of the capacitor 105g. An anode terminal of the diode 105i, an anode terminal of the diode 105k, and an anode terminal of the diode 105m are connected to one another, and those anode terminals are connected to the other terminal of the capacitor 105g.

The terminal 5a of the coil of one of the three phases of the generator 5 is connected to a connection point between the anode terminal of the diode 105h and the cathode terminal of the diode 105i. The terminals 5b and 5c of the coils of the other two phases are connected to a connection point between the anode terminal of the diode 105j and the cathode terminal of the diode 105k and to a connection point between the anode terminal of the diode 105l and the cathode terminal of the diode 105m, respectively.

The diode included in the inverter 105 is used for rectification, and a silicon diode or a silicon carbide transistor may be used.

Through changing of the revolution number RPM4 of the engine 4 based on the revolution number RPM3 and the torque TR3 required for the motor 3 and on the battery voltage VB, the direct-current voltage Vgen of the inverter 105 is adjusted. At this time, the inverter 105 uses the diodes 105h to 105m to rectify alternating-current power into direct-current power.

As a result, the switching loss of the inverter 105 is reduced, and the inverter can be downsized.

The present invention is not limited to the above-mentioned embodiments, and may include possible combinations thereof.

Further, the range of application of the drive system and the drive control method according to the present invention is not limited to an automobile. For example, the present invention is applicable to a train, or in a broader sense, to a device including a drive and power-generation mechanism configured to drive a driven component through use of a drive device to which a battery and a power generation device are connected.

Moreover, when the drive system and the drive control method are used to drive a general driven component in a broader sense, the vehicle speed in the above-mentioned case of a vehicle is replaced by a speed of the driven component.

REFERENCE SIGNS LIST 1 drive system for a vehicle, 2 battery, 3 motor, 4 engine, 5 generator, 6 switching device, 6a to 6c, 103a to 103f, and 105a to 105f power semiconductor switch, 105h to 105m diode, 7, 7a reactor, 8 drive wheel, 9 capacitor, 80 driven component, 100 drive device, 101 power generation device, 103, 105 inverter, 103g, 105g capacitor, 200 control unit, 201 drive device control unit, 202 power generation device control unit, 203 switching device control unit, 300 group of various detectors, 2000 processing circuit, 2001 processor, 2002 memory, D free-wheeling diode, S power semiconductor switch

The invention claimed is:

1. A drive system, comprising:
a battery;
a power generation device including:
   a power generator mounted to a shaft of an engine; and
   an inverter configured to convert an alternating-current voltage of the power generator into a direct-current voltage;
a drive device including:
   a motor configured to drive a driven component; and
   an inverter configured to perform bi-directional conversion between an alternating-current voltage of the motor and a direct-current voltage;
a switching device including a plurality of change-over switches configured to switch a connection of the battery and the power generation device at both ends of the drive device between a series connection and a parallel connection for connection;
a reactor arranged between the battery and the switching device or between the power generation device and the drive device; and
a control unit configured to control each of the switching device, the power generation device, and the drive device,
wherein the control unit includes processing circuitry
   to use, when a speed of the driven component is being changed, the switching device to fix the connection of the battery and the power generation device to any one of the series connection and the parallel connection after alternately switching the connection between the series connection and the parallel connection; and
   to use an efficiency map, in which an efficiency obtained by multiplying a revolution number of the motor and a torque of the motor by an efficiency of the engine, an efficiency of the power generator, and an efficiency of the inverter is defined in advance, to determine a revolution number of the engine based on a battery voltage of the battery.

2. The drive system according to claim 1, wherein the switching device includes at least three change-over switches as the plurality of change-over switches.

3. The drive system according to claim 2, wherein the processing circuitry is configured to change an engine revolution number of the engine based on a revolution number and a torque that are required for the motor and on the battery voltage.

4. The drive system according to claim 2, wherein the processing circuitry is configured to stop, when the speed of the driven component decreases after the battery and the power generation device are connected in series, an operation of the inverter configured to convert the alternating-current voltage of the power generator into the direct-current voltage, and, under a state in which the inverter is kept being stopped, use the switching device to fix connection of the battery and the power generation device to the parallel connection after alternately switching the connection between the series connection and the parallel connection.

5. The drive system according to claim 1, wherein the processing circuitry is configured to change an engine revolution number of the engine based on a revolution number and a torque that are required for the motor and on a battery voltage.

6. The drive system according to claim 5, wherein the processing circuitry is configured to increase the direct-current voltage of the power generation device when the battery voltage decreases after the battery and the power generation device are connected in series.

7. The drive system according to claim 5, wherein the processing circuitry is configured to increase the direct-current voltage of the power generation device when the battery voltage decreases after the battery and the power generation device are connected in parallel.

8. The drive system according to claim 1, wherein the processing circuitry is configured to stop, when the speed of the driven component decreases after the battery and the power generation device are connected in series, an operation of the inverter configured to convert the alternating-current voltage of the power generator into the direct-current voltage, and, under a state in which the inverter is kept being stopped, use the switching device to fix the connection of the battery and the power generation device to the parallel connection after alternately switching the connection between the series connection and the parallel connection.

9. The drive system according to claim 1, wherein the inverter configured to convert the alternating-current voltage of the power generator into the direct-current voltage includes a diode.

10. A drive system, comprising:
a battery;
a power generation device including:
    a power generator mounted to a shaft of an engine; and
    an inverter configured to convert an alternating-current voltage of the power generator into a direct-current voltage;
a drive device including:
    a motor configured to drive a driven component; and
    an inverter configured to perform bi-directional conversion between an alternating-current voltage of the motor and a direct-current voltage;
a switching device including a plurality of change-over switches configured to switch a connection of the battery and the power generation device at both ends of the drive device between a series connection and a parallel connection for connection;
a reactor arranged between the battery and the switching device or between the power generation device and the drive device; and
a control unit configured to control each of the switching device, the power generation device, and the drive device,
wherein the control unit includes processing circuitry to control, when a speed of the driven component is being changed, the direct-current voltage of the power generation device to be equal to or lower than a threshold value set in advance, and then use the switching device to fix the connection of the battery and the power generation device to any one of the series connection and the parallel connection.

11. The drive system according to claim 10, wherein the switching device includes at least three change-over switches as the plurality of change-over switches.

12. The drive system according to claim 11, wherein the processing circuitry is configured to change an engine revolution number of the engine based on a revolution number and a torque that are required for the motor and on the battery voltage.

13. The drive system according to claim 10, wherein the processing circuitry is configured to change an engine revolution number of the engine based on a revolution number and a torque that are required for the motor and on the batter voltage.

14. The drive system according to claim 10, wherein the inverter configured to convert the alternating-current voltage of the power generator into the direct-current voltage includes a diode.

15. A drive control method, which is performed in a drive system including:
a battery;
a power generation device including:
    a power generator mounted to a shaft of an engine; and
    an inverter configured to convert an alternating-current voltage of the power generator into a direct-current voltage;
a drive device including:
    a motor configured to drive a driven component; and
    an inverter configured to perform bi-directional conversion between an alternating-current voltage of the motor and a direct-current voltage;
a switching device including a plurality of change-over switches configured to switch a connection of the battery and the power generation device at both ends of the drive device between a series connection and a parallel connection for connection; and
a reactor arranged between the battery and the switching device or between the power generation device and the drive device,
the drive control method comprising:
    using, when a speed of the driven component is being changed, the switching device to fix the connection of the battery and the power generation device to any one of the series connection and the parallel connection after alternately switching the connection between the series connection and the parallel connection; and
    then using an efficiency map, in which an efficiency obtained by multiplying a revolution number of the motor and a torque of the motor by an efficiency of the engine, an efficiency of the power generator, and an efficiency of the inverter being defined in advance, to determine a revolution number of the engine based on a battery voltage of the battery.

16. The drive control method according to claim 15, further comprising stopping, when the speed of the driven component decreases after the battery and the power generation device are connected in series, an operation of the inverter configured to convert the alternating-current voltage of the power generator into the direct-current voltage, and, under a state in which the inverter is kept being stopped, using the switching device to fix the connection of the battery and the power generation device to the parallel connection after alternately switching the connection between the series connection and the parallel connection.

17. A drive control method, which is performed in a drive system including:
a battery;
a power generation device including:
    a power generator mounted to a shaft of an engine; and
    an inverter configured to convert an alternating-current voltage of the power generator into a direct-current voltage;
a drive device including:
    a motor configured to drive a driven component; and
    an inverter configured to perform bi-directional conversion between an alternating-current voltage of the motor and a direct-current voltage;
a switching device including a plurality of change-over switches configured to switch a connection of the battery and the power generation device at both ends of the drive device between a series connection and a parallel connection for connection; and
a reactor arranged between the battery and the switching device or between the power generation device and the drive device,
the drive control method comprising:
    controlling when a speed of the driven component is being changed, the direct-current voltage of the power generation device to be equal to or lower than a threshold value set in advance, and then using the switching device to fix the connection of the battery and the power generation device to any one of the series connection and the parallel connection.

\* \* \* \* \*